Oct. 10, 1944.　　　R. J. MILLER　　　2,359,930
FLUID COUPLING
Filed April 14, 1941
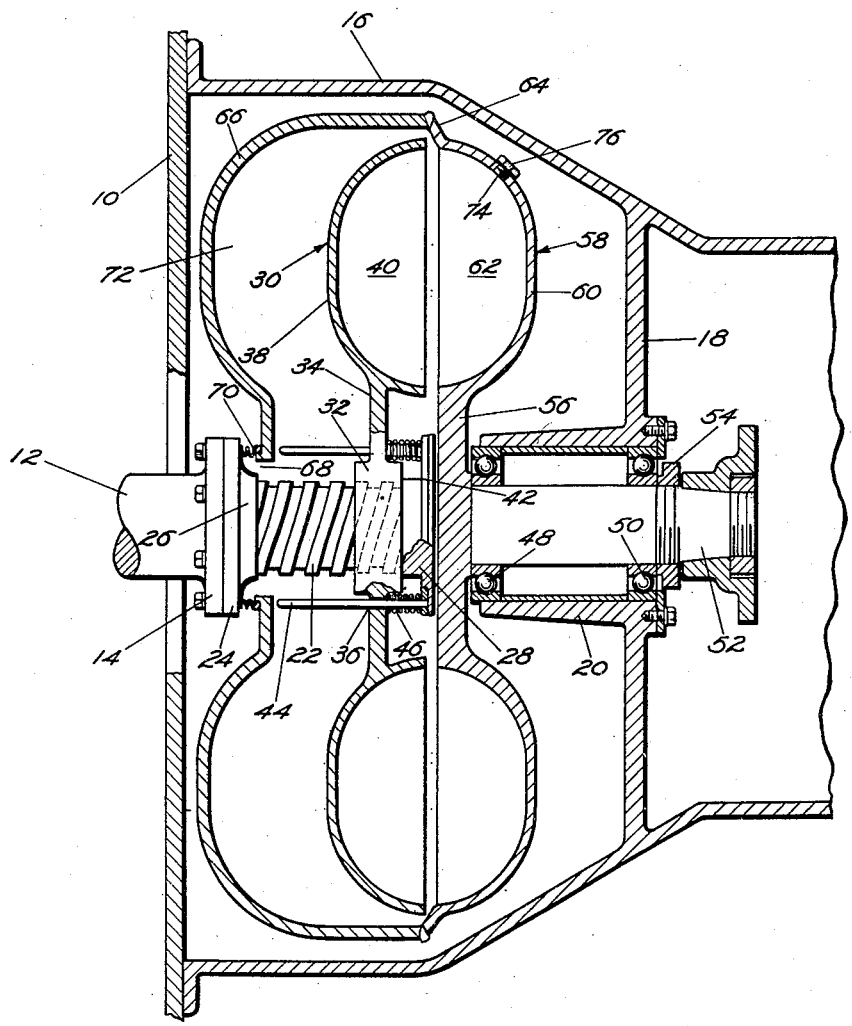
INVENTOR.
RAYMOND J. MILLER
BY
O. H. Fowler Patented Oct. 10, 1944

2,359,930

UNITED STATES PATENT OFFICE 2,359,930

FLUID COUPLING

Raymond J. Miller, Detroit, Mich., assignor to Hydraulic Brake Company, Detroit, Mich., a corporation of California Application April 14, 1941, Serial No. 388,544

5 Claims. (Cl. 60—54)

This invention relates to fluid couplings.

Broadly the invention comprehends a fluid coupling for driving and driven shafts. It is particularly adaptable for motor vehicles. In a preferred embodiment of the invention a driving shaft has an impeller mounted thereon for travel, and a driven shaft has a runner fixedly secured thereto for cooperation with the impeller. The coupling is operative automatically under the influence of the speed and load on the power plant of the vehicle.

An object of the invention is to provide a fluid coupling operative automatically to engage and disengage.

Another object of the invention is to provide a fluid coupling for a driving and a driven shaft operative automatically under the influence of the speed of rotation and load on the driving shaft.

Another object of the invention is to provide a fluid coupling for a driving and driven shaft including a relatively movable impeller and runner effective to engage and disengage the fluid circuit of the coupling as a resultant of the speed on the driving shaft.

Other objects and advantages of the invention will appear from the following description taken in connection with the drawing forming a part of this application.

The drawing is a comprehensive view largely in section, of a fluid coupling illustrating the various parts and the relation thereof to one another incorporated in the instant invention.

Referring to the drawing for more specific details of the invention, 10 represents the crank case of an internal combustion engine and 12 the crank shaft of the engine having thereon a flange 14. A bell housing 16 suitably secured to the crank case has an internal web 18 supporting a sleeve 20 in axial alignment with the crank shaft.

A screw 22 has on one end a flange 24 bolted or otherwise secured to the flange 14 of the driving shaft 12 to support the screw in axial relation to the shaft, and at the juncture of the screw and the flange is a concave shoulder 26, the purpose of which will hereinafter appear; and on the other end of the screw is a removable crown ring 28.

An impeller indicated generally at 30 includes a hub 32 mounted for travel on the screw 22. The hub has a web 34 provided with equi-spaced transverse openings 36, and the web supports a shroud 38 having mounted thereon spaced impeller blades 40. A ring 42 mounted for rotation on the crown ring 28 has thereon spaced rods 44 extended normal from the ring and through the openings 36 in the web 34, and sleeved on the rods between the web 34 and the ring 42 are coil springs 46 urging the impeller to travel on the screw 22 in the direction of the driving shaft.

Spaced bearings 48 and 50 in the sleeve 20 on the web 18 of the bell housing support for rotation a driven shaft 52 held against displacement by a retaining ring 54. The driven shaft is in axial alignment with the driving shaft 12, and the driven shaft has an enlarged head 56 supporting a runner indicated generally at 58 in oppositely disposed relation to the impeller 30 and providing in conjunction therewith a vortex chamber.

As shown, the runner includes a shroud 60 having mounted thereon a plurality of equi-spaced runner blades 62 and a peripheral flange 64, and a housing 66 suitably secured to the flange has a concentric opening 68 for the reception of the screw 22, and a suitable fluid seal 70 carried by the housing and slidable on the concave shoulder 26 of the screw effectively closes the opening. The runner 58 and the housing 66 provide in conjunction with one another a reservoir 72 provided with a filling opening 74 normally closed as by a plug 76.

In a normal operation, during initial rotation of the driving shaft 12 by force received from the power plant of a motor vehicle, the impeller 30 travels axially on the screw 22 against the resistance of the springs 46 toward the runner 58 until it abuts the crown ring 28. In this position the impeller is so related to the runner as to afford the most effective cooperation therebetween. This operation results in imposing a load on the driving shaft as a resultant of resistance introduced by the runner and the consequent rotation of the runner and transmission of force therefrom to the driven shaft 52. This relation of the impeller and runner remain substantially unchanged so long as the load on the driven shaft is retained substantially constant. However, should the load be reduced to such an extent that it is less than that exerted by the springs 46, or should the runner 58 tend to overrun the impeller 30, the impeller travels axially away from the runner on the screw 22 so as to increase the spaced relationship of the impeller and the runner to such an extent that the fluid circuit therebetween is ineffective for transmitting force to the runner.

It is to be understood that when the runner 58 is static and the impeller 30 is rotating at an idling speed, the force of the springs 46 is sufficient to retain the impeller in substantial spaced relation to the runner, and that under this condition the fluid circuit has not sufficient energy to transmit force to the runner, hence creepage of the runner is eliminated. However, immediately upon increase of speed of rotation of the driving shaft, the impeller moves toward the runner to render the fluid circuit effective.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,

1. A fluid coupling comprising a driving shaft, a screw thereon, an impeller mounted for limited travel on the screw, means between the shaft and the impeller resisting axial movement of the impeller in one direction and assisting axial movement in the reverse direction, a driven shaft, a housing fixedly secured to the driven shaft enclosing the impeller and screw, and a runner on the housing for cooperation with the impeller.

2. A fluid coupling comprising a crank shaft, a screw secured thereto and extended axially therefrom, a crown ring on the screw, an impeller mounted for travel on the screw, compressible members between the crown ring and impeller, a driven shaft, a housing thereon enclosing the impeller and screw, and a runner on the housing for cooperation with the impeller.

3. A fluid coupling comprising a driving shaft, an impeller mounted thereon for rotation therewith and for limited axial movement, means between the shaft and the impeller yieldingly resisting movement of the impeller in one direction, a driven shaft, a housing fixedly secured thereto enclosing the impeller, and a runner mounted on the housing for cooperation with the impeller.

4. A fluid coupling comprising a driving shaft, a screw fixedly secured thereto and extended axially therefrom, a crown ring on the screw, an impeller mounted for travel on the screw, a ring slidable on the crown ring, rods on the ring extended through a part of the impeller, springs on the rods between the ring and the impeller, a driven shaft supported for rotation in axial alignment with the driving shaft, a housing fixedly secured to the driven shaft enclosing the impeller and having sliding engagement with a shoulder of the screw, and a runner mounted on the interior of the housing for cooperation with the impeller.

5. A fluid coupling comprising a driving shaft, an impeller and a runner for cooperation with one another, means connecting the impeller to the driving shaft for rotation therewith and axial movement thereon operative to automatically move the impeller toward the runner at high speeds of rotation of the driving shaft and to move the impeller away from the runner at low speeds of rotation of the shaft, and means interposed between the shaft and the impeller resisting movement of the impeller toward the runner and assisting movement of the impeller away from the runner.

RAYMOND J. MILLER.